United States Patent [19]
Prasad et al.

[11] Patent Number: 5,264,171
[45] Date of Patent: Nov. 23, 1993

[54] METHOD OF MAKING SPIRAL-WOUND HOLLOW FIBER MEMBRANE FABRIC CARTRIDGES AND MODULES HAVING FLOW-DIRECTING BAFFLES

[75] Inventors: Ravi Prasad; Charles J. Runkle, both of Charlotte, N.C.; Harry F. Shuey, San Dimas, Calif.

[73] Assignee: Hoechst Celanese Corporation, Somerville, N.J.

[21] Appl. No.: 816,511

[22] Filed: Dec. 31, 1991

[51] Int. Cl.⁵ .................. B01D 63/02; B01D 63/06; B29C 39/10; B32B 31/06
[52] U.S. Cl. ................................ 264/103; 264/138; 264/251; 264/254; 264/262; 264/263
[58] Field of Search .............. 264/103, 138, 251, 254, 264/261, 262, 263, 279

[56] References Cited

U.S. PATENT DOCUMENTS

| | | | |
|---|---|---|---|
| 3,228,877 | 1/1966 | Mahon | 210/638 |
| 3,422,008 | 1/1969 | McLain | 210/646 |
| 3,557,962 | 1/1971 | Kohl | 210/321.88 |
| 3,872,014 | 3/1975 | Schell | 210/232 |
| 3,957,648 | 5/1976 | Roget et al. | 210/321.88 |
| 4,033,878 | 7/1977 | Foreman et al. | 210/321.74 |
| 4,220,535 | 9/1980 | Leonard | 210/321.61 |
| 4,293,418 | 10/1981 | Fujii | 210/321.81 |
| 4,367,139 | 1/1983 | Graham | |
| 4,430,219 | 2/1984 | Kuzumoto | 210/321.88 |
| 4,460,641 | 7/1984 | Barer et al. | 428/246 |
| 4,649,991 | 3/1987 | Neuhaus | 165/159 |
| 4,758,341 | 7/1988 | Banner | 210/232 |
| 4,781,834 | 11/1988 | Sekino | 210/321.88 |
| 4,814,079 | 3/1989 | Schneider | 210/321.83 |
| 4,855,058 | 8/1989 | Holland et al. | 210/652 |
| 4,911,846 | 3/1990 | Akasu et al. | 210/645 |
| 4,929,259 | 5/1990 | Caskey | 55/158 |
| 4,940,617 | 7/1990 | Baurmeister | 428/36.3 |
| 4,961,760 | 10/1990 | Caskey | 55/158 |
| 4,997,564 | 3/1991 | Herczeg | 210/321.61 |
| 5,013,437 | 5/1991 | Trimmer | 210/321.78 |
| 5,026,479 | 6/1991 | Bikson et al. | 210/321.8 |
| 5,034,126 | 7/1991 | Reddy et al. | 210/321.74 |
| 5,059,374 | 10/1991 | Krueger et al. | 264/251 X |
| 5,154,832 | 10/1992 | Yamamura et al. | 210/640 |
| 5,158,581 | 10/1992 | Coplan | 55/16 |

FOREIGN PATENT DOCUMENTS 93677 11/1983 European Pat. Off. .
233946 3/1986 German Democratic Rep. .
WO83/00098 1/1983 PCT Int'l Appl. .

OTHER PUBLICATIONS

Translation of German Reference 233,946 (published Mar. 19, 1986).

*Primary Examiner*—Leo B. Tentoni
*Attorney, Agent, or Firm*—Jay M. Brown

[57] ABSTRACT

This invention provides spiral-wound hollow fiber membrane fabric-containing cartridges and modules for separations and other phase contact applications, in which the cartridges contain baffles that induce radial feed fluid flow in the shell side of the hollow fiber membrane bundle; and methods for fabricating such cartridges.

12 Claims, 10 Drawing Sheets

METHOD OF MAKING SPIRAL-WOUND HOLLOW FIBER MEMBRANE FABRIC CARTRIDGES AND MODULES HAVING FLOW-DIRECTING BAFFLES

BACKGROUND

This invention relates to the field of spiral-type hollow fiber membrane fabric-containing cartridges and modules for separations and other phase contact applications. In particular, this invention relates to improved cartridges and modules containing flow-directing baffles. The teachings of this invention can, if desired, be used in conjunction with the subject matter of applicant's copending U.S. patent application entitled, "Spiral-Wound Hollow Fiber Membrane Fabric Cartridges and Modules Having Integral Turbulence Promoters", filed concurrently herewith, which is hereby incorporated by reference.

There is a great deal of prior art relating to the structure, fabrication and use of spiral-type hollow fiber-containing cartridges. Among the early disclosures of such devices are Mahon U.S. Pat. No. 3,228,877 and McLain U.S. Pat. No. 3,422,008, both of which are incorporated herein by reference. In general, a bundle of hollow fibers is positioned around and parallel to the longitudinal axis of a rod-shaped core (which may be a hollow mandrel and may or may not be removed after the bundle is fabricated), the ends of the hollow fiber bundle are potted in tube sheets, and the cartridge is fitted into a pressure housing suitably ported to facilitate feed, permeate and concentrate flows, to constitute a complete module.

More recently, the art has improved such cartridges by forming the hollow fibers into a fabric-like web in which the hollow fibers, parallel to the core axis, are held in place relative to each other by transverse filaments which may or may not also be hollow fibers.

Despite these developments, the challenge to optimize the operability, efficiency and durability of these hollow fiber-containing cartridges has continued. The flow of fluids (both liquid and gaseous) through the bundle can present further problems for the operator, including channeling, growth of boundary layers and other inefficiencies in fluid/membrane contact (which may prevent effective mass transfer). Hence, some recent developments in the art suggest the addition of flow-controlling baffles.

The Caskey U.S. Pat. No. 4,929,259 discloses hollow fiber-containing spiral cartridges having baffles which are parallel to the core axis, intended to promote countercurrent flow. Either one spiral baffle wound up with the hollow fibers onto the core, or a series of concentric annular baffles enclosing the hollow fibers, may be employed. (See also, Caskey U.S. Pat. No. 4,961,760, and Trimmer U.S. Pat. No. 5,013,437).

The Neuhaus U.S. Pat. No. 4,649,991 discloses a hollow fiber cartridge made from stacked layers in which the hollow fibers are intermittently bonded by crosspieces which are superimposed to form flow channels for the hollow fibers in the cartridge. The crosspieces of each layer of hollow fibers are superimposed in a stack, so that they form a shell-side flow barrier when assembled.

The baffles taught by the Caskey patents run parallel to the core axis: they do nothing to address channeling and boundary layer growth, which both promote fluid flow tangentially along the longitudinal direction of the hollow fibers with inadequate contact on the membrane surface. The Neuhaus cartridge is not a spiral-type device, because the layers of hollow fibers are stacked, rather than rolled up. Moreover, since such cartridges are formed by a stacking procedure, they will be relatively square or rectangular in cross-section—not round. The resulting cartridge will contain "dead space" with uneven flow at the sharp corners, and construction of an appropriate pressure container to handle the high stresses in the centers of its flat sides will be relatively difficult and require added structural materials. Further, as illustrated in FIGS. 2 and 3 of Neuhaus, the crosspieces for each stack must be carefully lined up during manufacture—a difficult, tedious and inherently unreliable operation. Moreover, although the crosspieces promote transverse flow in the cartridge, such flow is not symmetrical with respect to the core axis, and is therefore not radial flow: this results in inefficient fluid-membrane contact.

It is therefore an object of this invention to provide improved spiral-type hollow fiber membrane fabric-containing cartridges and modules containing flow-directing baffles, for separations and other phase contact applications.

It is another object of this invention to provide such cartridges and modules in which flow-directing baffles are axially positioned to promote radial flow of fluids throughout the hollow fiber bundle.

It is yet another object of this invention to provide such cartridges and modules in which feed fluid flow is intermittently directed near to and/or through a portion of the core, and subsequently out to the periphery of the bundle.

It is still another object of this invention to provide a number of cartridge and module designs yielding radial feed fluid flow patterns which can be selected for particular desired membrane contact regimes.

It is an additional object of this invention to provide methods for constructing the improved cartridges.

Further objects will be set forth in the discussion below.

SUMMARY OF THE INVENTION

According to the invention, improvements are provided in a spiral-type hollow fiber membrane fabric-containing module, comprising:

a. a plurality of hollow fiber membranes each having a lumen, said membranes being formed into a fabric-like array in which the hollow fibers substantially are mutually-parallel and constitute the fabric weft, and are held in spaced-apart relationship by filaments constituting the fabric warp;

b. the array being wound upon an axis which is substantially parallel to the hollow fibers into a spirally-wound membrane bundle having two bundle ends and a cylindrical exterior surface;

c. each of the two bundle ends being potted in resinous potting material serving to seal the bundle end into an adjacent monolithic tube sheet, a portion of the bundle between the two tube sheets being free from potting material to form a shell-side region, and the lumen ends of the hollow fibers constituting a first one of the bundle ends being exposed and communicating with the exterior of the bundle;

d. a housing having first and second housing ends and a cylindrical housing interior and being suitably shaped to contain the membrane bundle, having means adjacent the first housing and sealing the tube sheet adjacent the first bundle end to the cylindrical housing interior, said housing which contains the bundle defining two regions mutually communicating through the membrane including (1) a shell-side space exterior to the portion of the bundle between the tube sheets and within the housing, and (2) a space including the hollow fiber lumens and the first bundle end;

e. first end cap means adjacent the first housing end and suitably shaped, together with the cylindrical housing interior and the first bundle end, to seal the first housing end and define a first chamber communicating with the membrane lumens;

f. second end cap means adjacent the second housing end and suitably shaped, together with the cylindrical housing interior and the second bundle end, to seal the second housing end and define a second chamber;

g. the housing having shell-side access means including at least one port communicating with the shell-side space, arranged to permit fluid injection and withdrawal therethrough; and h. the housing having at least one port communicating with the first chamber, arranged to permit fluid injection and withdrawal therethrough;

the improvement comprising:

i. impermeable wrapping means covering the cylindrical exterior surface of the bundle, except for an uncovered portion accommodating the shell-side access means; and j. at least one axially-symmetrical sealing means formed from resinous potting material within the shell-side region in a shape which is rotationally symmetrical about the axis, said sealing means being in sealing engagement with the impermeable wrapping means and extending to a distance away from the axis, forming an axial sub-portion of the shell-side region which is unobstructed to fluid flow, said sealing means dividing the shell-side region into two shell-side portions in mutual fluid communication through the sub-portion.

In another embodiment, further improvements are provided in a spiral-type hollow fiber membrane fabric-containing module, comprising:

i. at least one axially-symmetrical sealing means formed from resinous potting material within the shell-side region in a shape which is rotationally symmetrical about the axis, said sealing means intersecting the axis and extending to a perimeter which is located at a distance away from the cylindrical housing interior, forming a sub-portion of the shell-side region between the cylindrical interior of the housing and the perimeter of the sealing means which is unobstructed to fluid flow, said sealing means dividing the shell-side region into two shell-side portions in mutual fluid communication through the sub-portion.

In additional embodiments, one or more of each of the above two types of sealing means are employed together.

In yet further embodiments, the module additionally comprises a hollow mandrel having a longitudinal axis and a cylindrical exterior surface, an axial bore, and perforations along the surface which communicate with the bore.

In other embodiments, both of the lumen ends of the hollow fibers are exposed and communicate with the exterior of the bundle.

The invention also provides improvements in a spiral-type hollow fiber membrane fabric-containing cartridge, comprising:

a. a plurality of hollow fiber membranes each having a lumen, said membranes being formed into a fabric-like array in which the hollow fibers substantially are mutually-parallel and constitute the fabric weft, and are held in spaced-apart relationship by filaments constituting the fabric warp;

b. the array being wound upon an axis which is substantially parallel to the hollow fibers into a spirally-wound membrane bundle having two bundle ends and a cylindrical exterior surface;

c. each of the two bundle ends being potted in resinous potting material serving to seal the bundle end into an adjacent monolithic tube sheet, a portion of the bundle between the two tube sheets being free from potting material to form a shell-side region, and the lumen ends of the hollow fibers constituting at least a first one of the bundle ends being exposed and communicating with the exterior of the bundle;

the improvement comprising:

d. impermeable wrapping means covering the cylindrical exterior surface of the bundle; and e. at least one axially-symmetrical sealing means formed from resinous potting material within the shell-side region in a shape which is rotationally symmetrical about the axis, said sealing means being in sealing engagement with the impermeable wrapping means and extending to a distance away from the axis, forming an axial sub-portion of the shell-side region which is unobstructed to fluid flow, said sealing means dividing the shell-side region into two shell-side portions in mutual fluid communication through the sub-portion.

In additional embodiments, the improvement comprises:

d. at least one axially-symmetrical sealing means formed from resinous potting material within the shell-side region in a shape which is rotationally symmetrical about the axis, said sealing means intersecting the axis and extending to a perimeter which is located at a distance away from the cylindrical housing interior, forming a sub-portion of the shell-side region between the cylindrical interior of the housing and the perimeter of the sealing means which is unobstructed to fluid flow, said sealing means dividing the shell-side region into two shell-side portions in mutual fluid communication through the sub-portion.

Further embodiments will be described below. The invention also provides methods for the manufacture of the spiral-type hollow fiber membrane fabric-containing cartridges. The various embodiments will be detailed in the discussion below, and defined in the appended claims.

BRIEF DESCRIPTION OF THE DRAWINGS

It is assumed for purposes of this discussion that the feed fluid flows generally from left to right in these drawings.

FIG. 16-B is a schematic drawing of a left-facing modified sealing means (either axial or perimeter) which is funnel-shaped with straight sides.

FIG. 16-C is a schematic drawing of a right-facing modified sealing means (either axial or perimeter) which is funnel-shaped with curved sides.

FIG. 16-D is a schematic drawing of a left-facing modified sealing means (either axial or perimeter) which is funnel-shaped with curved sides.

DESCRIPTION OF THE PREFERRED EMBODIMENTS

Figure 1:
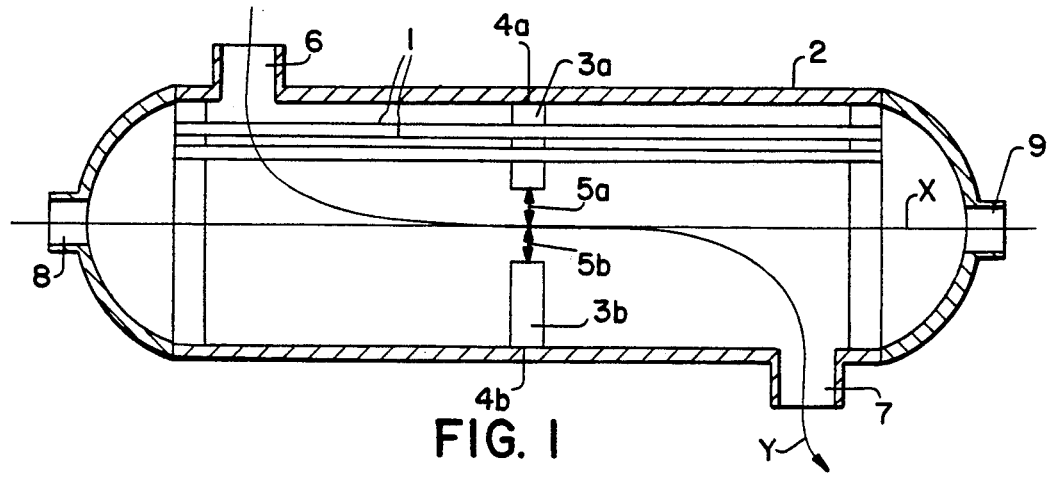
FIG. 1 is a schematic drawing of a module according to the invention which contains one perimeter sealing means and no mandrel.

This invention is an improvement in the art of spiral-type hollow fiber membrane fabric-containing cartridges and modules for separations and other phase contact applications. The term "phase contact" is used herein to generally describe any process involving mass- and/or heat-transfer. This discussion will first make reference to previous disclosures of the components, fabrication and operation of such generally conventional devices, and then return to the improvements according to this invention.

The hollow fibers suitable for use in the invention generally include all such materials which can be formed into spiral-type membrane-containing cartridges for separations and other phase contact applications. These hollow fibers may, for example, be microporous, foraminous, or allow diffusion transfer. Hollow fibers of relatively large diameter (sometimes referred to as "tubular membranes") can also be used provided that they have sufficient structural strength to maintain their shape in the bundle. Suitable hollow fibers, described by dimensions and other structural features, and including materials for making the hollow fibers and processes for such manufacture, are disclosed, for example, in the following U.S. patents which are hereby incorporated by reference: Fujii U.S. Pat. No. 4,293,418; Kuzumoto U.S. Pat. No. 4,430,219; Banner U.S. Pat. No. 4,758,341; Sekino U.S. Pat. No. 4,781,834; Akasu U.S. Pat. No. 4,911,846; Caskey U.S. Pat. No. 4,961,760; and Bikson U.S. Pat. No. 5,026,479.

The selected hollow fibers are then fabricated into a fabric-like array for assembly into the cartridge. Generally, the principal benefit of incorporating the hollow fibers into a fabric-like array rather than using loose fibers, is that the fabric structure holds adjacent hollow fibers in a spaced-apart, mutually parallel relationship. This configuration promotes regularity of the bundle and resultant uniformity in fluid flow dynamics. In preferred embodiments, the hollow fibers constitute the weft of a fabric, e.g., are placed transversely between warp filaments by the guide elements of a loom. Given that the hollow fibers constituting the fabric weft must be held in place by warp filaments, such warp can take any form as taught in the art for fabric-like hollow fiber arrays for spiral bundle production. For example, the warp filaments can themselves be solid or also be hollow fibers, and the fabric construction can be selected from the variety taught by the art. The fabric can, alternatively, be prepared by substituting warp for weft and weft for warp, so that the hollow fibers, constituting the warp, are held by weft filaments. Hence, the terms "warp" and "weft" are used interchangeably hereinafter, and merely designate two groups of filaments or fibers which are oriented transversely to one another to yield a fabric-like web. Suitable hollow fiber-containing fabric-like arrays, including their construction, structure and performance, are taught, for example, in the following U.S. patents which are hereby incorporated by reference: Kohl U.S. Pat. No. 3,557,962; Barer U.S. Pat. No. 4,460,641; Akasu U.S. Pat. No. 4,911,846; and Baurmeister U.S. Pat. No. 4,940,617; see also European Patent Application No. 0,093,677, published Nov. 9, 1983; and German Democratic Republic Patent Application No. 233,946, published Mar. 19, 1986.

According to preferred embodiments, a rod-shaped core is located at the longitudinal axis of the cartridge (if desired, this core can be temporarily placed at the axis, and removed following bundle fabrication). Although a solid rod can be used solely to provide structural support for the cartridge, hollow core mandrels are preferred. Core mandrels generally have a longitudinal axis and a cylindrical exterior surface, an axial bore, and perforations along the surface which communicate with the bore. Although the hollow mandrel generally has an unobstructed axial bore, one or more core plugs may be installed or integrally formed in the mandrel, as will be explained later. Typical mandrels have cylindrical interior and exterior surfaces; however it is within the scope of the invention to employ mandrels having other surfaces, for example, mandrels having multi-sided geometric cross-sections (pentagonal, hexagonal, and the like), and mandrels whose bores contain internal axial flow dividers. The purpose of the perforations along the mandrel surface which communicate with the bore, is to facilitate fluid flow between the bundle and the mandrel bore along the mandrel's longitudinal axis. The mandrel perforations can take various shapes, such as round holes and elongated slits. In cases among the various embodiments of the invention in which it is desirable to control flow volumes of fluid out of or into the mandrel bore across its length, the mandrel perforations along the length of the bore can be sized and shaped accordingly. The perforations can also be confined to selected portions of the mandrel length to control flow volumes and paths (e.g., co-current or countercurrent). The overall length of the mandrel can also be adjusted to suit particular needs. Suitable mandrels are disclosed in the following U.S. patents which are hereby incorporated by reference: Kuzumoto U.S. Pat. No. 4,430,219; and Caskey U.S. Pat. No. 4,961,760.

The process steps discussed immediately below are carried out conventionally, and as such will only be briefly mentioned. Further information on them can be found, for example, in the following U.S. patents which are hereby incorporated by reference: Caskey U.S. Pat. No. 4,961,760; and Bikson U.S. Pat. No. 5,026,479.

The fabric-like array is wound onto the core surface (or itself, if no core is used) to form a spirally-wound, cylindrically-shaped membrane bundle having two bundle ends communicating with the mandrel bore. Assuming that the selected fabric consists of hollow fiber weft held together by solid warp filaments, then an end of the fabric is preferably aligned so that the hollow fibers are substantially parallel to the mandrel axis, the fabric end is attached to the mandrel (e.g. by clamping or adhesive), and the assembly is wound up into a cylinder. If, alternatively, a fabric having both weft and warp hollow fibers is used, then it may be desirable in certain applications to seal the warp fibers into communication with the mandrel perforations, and eliminate direct communication between the mandrel bore and the shell-side region. It is well known in the art that hollow fiber-containing fabric-like arrays can be wound helically onto a core surface, so that the hollow fibers proceed along a helical path with respect to the axis, with their two ends located at opposite ends of the core. This invention can readily be practiced with such arrays; it is also not strictly required (although preferred), that the hollow fibers are mutually parallel.

Next, the two ends of the bundle are potted in resinous potting material serving to seal each of the bundle ends into a monolithic tube sheet. Both the materials and the basic methodology for carrying out potting to form tube sheets are well known in the art, as shown, for example, in the Caskey U.S. Pat. No. 4,961,760 which is hereby incorporated herein by reference. Any material known to those skilled in the art as useful for potting of hollow fiber bundles can be used. (Hereinafter, these materials will be referred to generally as "resinous potting materials"). When the potting process is completed, a substantial portion of the bundle (between the two tube sheets) will be free from resinous potting material, and one or both of the potted ends of the bundle are then trimmed so that the lumen ends of each hollow fiber at the trimmed end(s) will be exposed.

Finally, the potted bundle is fitted into a suitable housing to constitute a module. Generally, the housing should have two open ends and a cylindrical interior, and be suitably shaped to contain the membrane bundle. After the bundle is installed in the housing, the tube sheet(s) adjacent to the bundle end(s) with exposed lumens is (are) sealed to the cylindrical interior of the housing, to positively prevent fluid flow between the shell side and the lumen side without passage through the membrane. At this point, the cartridge has been divided into two regions mutually communicating through the membrane including (1) a shell-side space which is exterior to the portion of the bundle between the tube sheets and is within the housing, and (2) a space including the hollow fiber lumens and the exposed bundle end(s). Next, end cap means suitably shaped to seal each of the two open housing ends are provided. These end caps, together with the housing interior and the bundle ends, serve to define two chambers, one or both of which communicate with the membrane lumens. To facilitate fluid introduction and recovery, suitable ports are provided for the housing. In embodiments where no mandrel is present, the housing must have at least one port communicating with the shell-side space, arranged to permit fluid injection and withdrawal therethrough. In embodiments including a mandrel, such ports are optional. In all embodiments of the invention, the housing must have at least one port communicating with the lumen side, arranged to permit fluid injection and withdrawal therethrough. Multiple ports can be provided, if desired. These considerations are further discussed in the prior art, including Caskey U.S. Pat. No. 4,961,760, which is hereby incorporated by reference.

According to the invention, the above conventional spiral-type hollow fiber membrane fabric-containing cartridge technology has been advanced by the addition of at least one axially-symmetrical baffle (hereinafter "sealing means") formed within the shell-side region of the hollow fiber bundle in a shape which is rotationally symmetrical about the axis. In its broadest scope, this invention is directed to creating radial cross-flow between the shell-side region and the hollow fiber lumens; the benefits of such radial cross-flow include: reduced channeling and development of boundary layers (tangential flow of fluid past the hollow fibers without membrane surface contact) and increased direct contact between fluids and membrane surfaces (and hence, greater phase contact and more efficient cartridge performance).

The Figures are discussed below. FIGS. 1-15 schematically illustrate various embodiments of the modules of the invention, including housing members. The discussion of FIGS. 1-15 will be directed to the cartridges; typical housing members and features will be addressed in the discussion of FIGS. 17-18.

Referring to FIG. 1, hollow fiber fabric bundle (1) is contained in housing (2), which has no mandrel (for simplicity). A single radially-symmetrical disc-shaped perimeter sealing means (3a, 3b) extends from the perimeter (4a, 4b) of the bundle (1) to a distance (5a, 5b) from the axis (x). As shown by the arrow (y), shell-side feed enters from shell-side feed port (6) in the side of the housing (2) and travels in a path which has both tangential and axially-cross flow portions to the shell-side concentrate port (7) on the side of the housing (2); permeate is withdrawn through lumen-side port(s) (8, 9) at either or both ends of the bundle (1).

Fabrication of the module schematically shown in FIG. 1 proceeds conventionally as described above (the fabric serving as its own axis) until the fabric has been wound up to the predetermined distance from its axis. A bead of a suitable sealing material (which may conveniently be the same material as later used to pot the bundle, and will be referred to generally as "resinous potting materials"), is then continuously applied beginning at the unwound edge of the fabric facing and adjacent the nip with the wound portion, and preferably at the midway point between the two bundle ends, and proceeding in a line perpendicular to the axis (x), forming a continuous seal extending to the perimeter of the bundle. This seal has a planar disc-like monolithic shape.

Figure 2:
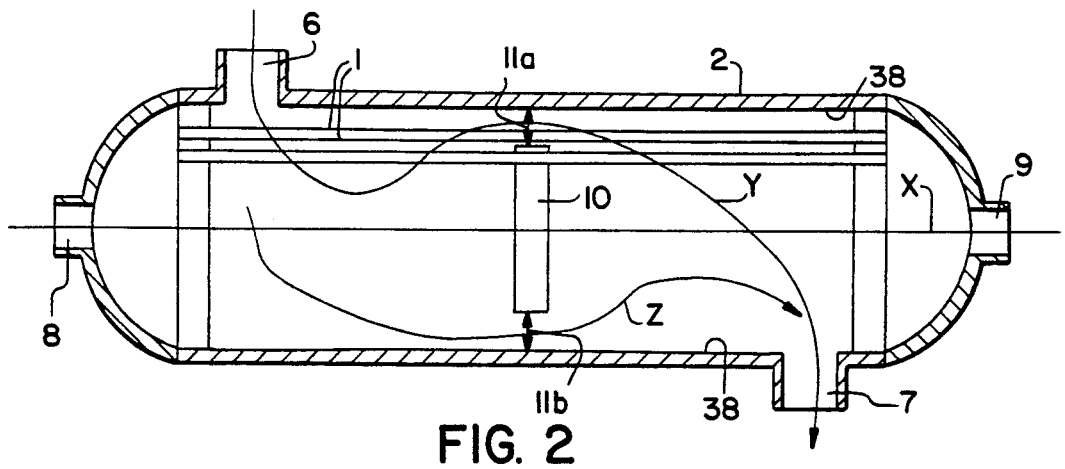
FIG. 2 is a schematic drawing of a module according to the invention which contains one axial sealing means and no mandrel.

FIG. 2 schematically illustrates another embodiment of the invention, where again the hollow fiber fabric bundle (1) is contained in housing (2), which has no mandrel. A single radially-symmetrical disc-shaped axial sealing means (10) extends from the axis (x) to a distance (11a, 11b) away from the cylindrical housing interior (38). As shown by the arrows (y, z), shell-side feed enters from shell-side feed port (6) in the side of the housing (2) and travels in a path which has both tangential and axially-cross flow portions to the shell-side concentrate port (7) on the side of the housing (2); permeate is withdrawn from lumen-side ports (8, 9) at either or both ends of the bundle (1). The axial sealing means (10) is constructed by beginning a bead of sealing material at the module axis and proceeding in a direction perpendicular to the axis outward along the unwound edge of the fabric facing and adjacent the advancing nip with the wound portion, until the desired distance from the cylindrical housing interior (38) is reached.

Generally, a relatively narrow bead of sealing material should be used in fabricating the axial- and perimeter-sealing means, to minimize the shell-side space consumed by the sealing means, and attendant reduction in the module's mass transfer efficiency. Further, the sealing material should be thick enough to avoid excessive migration or smearing; preferably it is thixotropic.

Figure 3:
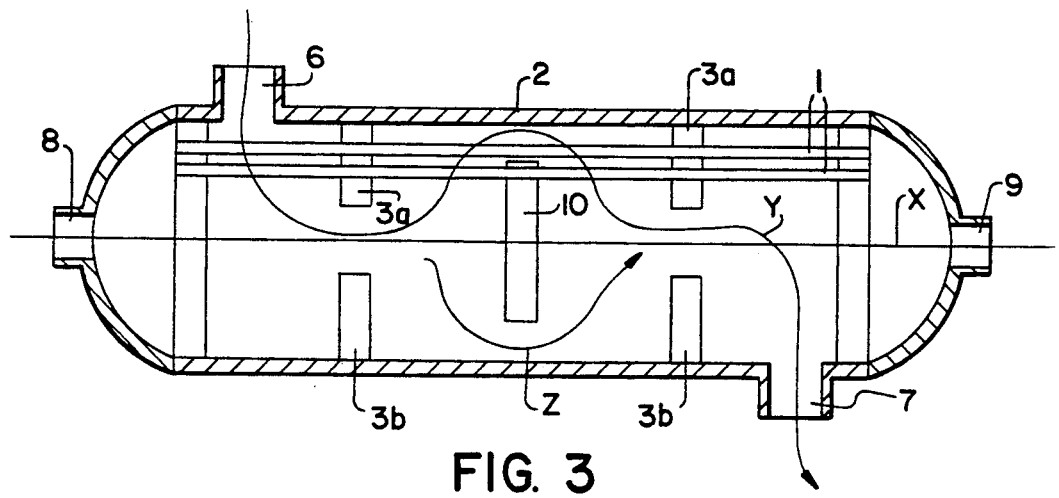
FIG. 3 is a schematic drawing of a module according to the invention which contains one axial sealing means spaced apart between two perimeter sealing means, and no mandrel.

Referring now to FIG. 3, in this embodiment of the invention one axial sealing means (10) is interposed between two perimeter sealing means (3a, 3b) spaced out along the axis (x). The three sealing means are simultaneously fabricated into the bundle (1), following the steps given in the above discussion of FIGS. 1 and 2. As shown by the arrows (y, z), feed enters from shell-side feed port (6) in the side of the housing (2) and travels first toward the axis (x), then toward the perimeter, then back toward the axis (x), and out of the shell-side concentrate port (7) on the side of the housing (2), (preferably, 180 degrees around the axis (x) compared with the point of feed entry into the housing). Permeate withdrawal is the same as in FIGS. 1 and 2.

Figure 4:
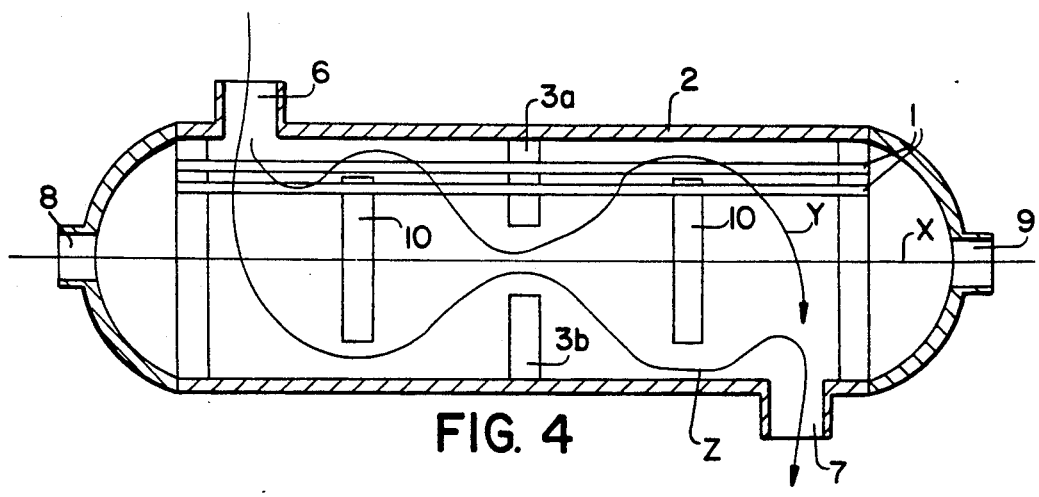
FIG. 4 is a schematic drawing of a module according to the invention which contains one perimeter sealing means spaced apart between two axial sealing means, and no mandrel.

Next referring to FIG. 4, in this embodiment of the invention one perimeter sealing means (3a, 3b) is interposed between two axial sealing means (10) spaced out along the axis. The three sealing means are simultaneously fabricated into the bundle (1), following the steps given in the above discussion of FIGS. 1 and 2. Analogously to FIG. 3, shell-side feed flows as indicated by the arrows (y, z). Permeate withdrawal is the same as in FIGS. 1 and 2.

In many cases it will be desirable to provide a hollow mandrel, as discussed above, to serve as the core for the module. In such cases, the feed fluid can be directed into the center of the bundle through the mandrel, instead of being directed into a side of the housing (the latter of which detracts from radial flow, because the flow enters the bundle only on one side). In such cases, it is necessary to supplement the radially-symmetrical sealing means with one or more core plugs which may be installed or integrally formed in the mandrel, to prevent the feed from simply flowing straight through the mandrel bore without entering the bundle. Core plugs in general are known in the art, as shown in the following U.S. patents which are hereby incorporated by reference: Schell U.S. Pat. No. 3,872,014; Foreman U.S. Pat. No. 4,033,878; Caskey U.S. Pat. No. 4,961,760; Herczeg U.S. Pat. No. 4,997,564; and Reddy U.S. Pat. No. 5,034,126.

Figure 5:
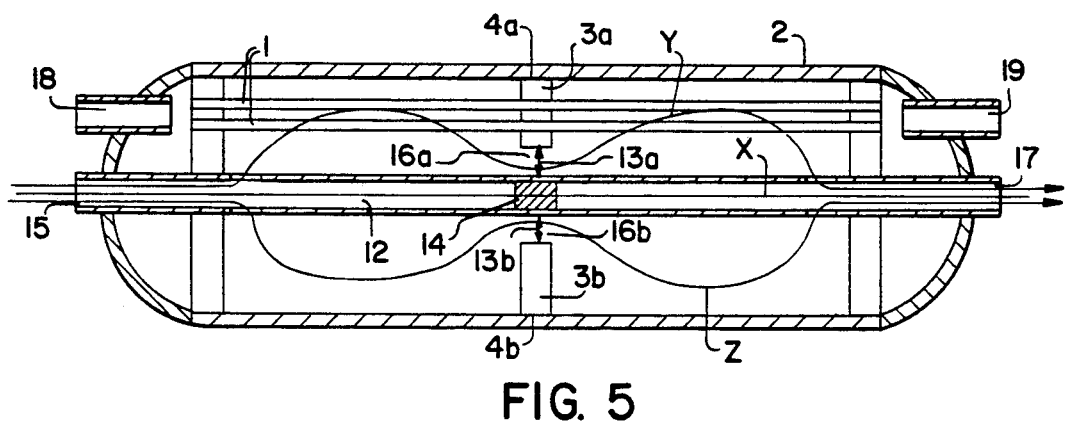
FIG. 5 is a schematic drawing of a module according to the invention which contains a mandrel and one perimeter sealing means having an adjacent core plug.

Referring now to FIG. 5, a schematic drawing of a module is shown, in which hollow fiber fabric bundle (1) is contained in housing (2), surrounding mandrel (12). A single radially-symmetrical disc-shaped perimeter sealing means (3a 3b) extends from the perimeter (4a, 4b) of the bundle (1) to distance (13a, 13b) from the mandrel (12), and a core plug (14) is provided in the bore of the mandrel (12) at the point where the perimeter sealing means (3a, 3b) approaches the surface of the mandrel (12). As shown by the arrows (y, z), feed fluid enters the upstream mandrel port (15), is forced radially outward by the core plug (14) into the shell-side of the bundle (1), passes through the unobstructed axial subportion (16a, 16b) of the bundle (1), and exits through the downstream mandrel port (17). Since there is no blockage in the bore of the mandrel (12) downstream of the single core plug (14), the core plug (14) is preferably located near the downstream mandrel port (17) to minimize stagnant areas in the shell-side flow. Permeate is collected in the lumen-side and withdrawn at one or both off-center lumen ports (18, 19) at the ends of the bundle (1). Alternatively (not shown), feed can be introduced in the lumen-side at one of the off-center lumen ports (18, 19) at the ends of the bundle (1), and a sweep fluid can be introduced through the upstream mandrel port (15) or downstream mandrel port (17) to carry away permeate.

Figure 6:
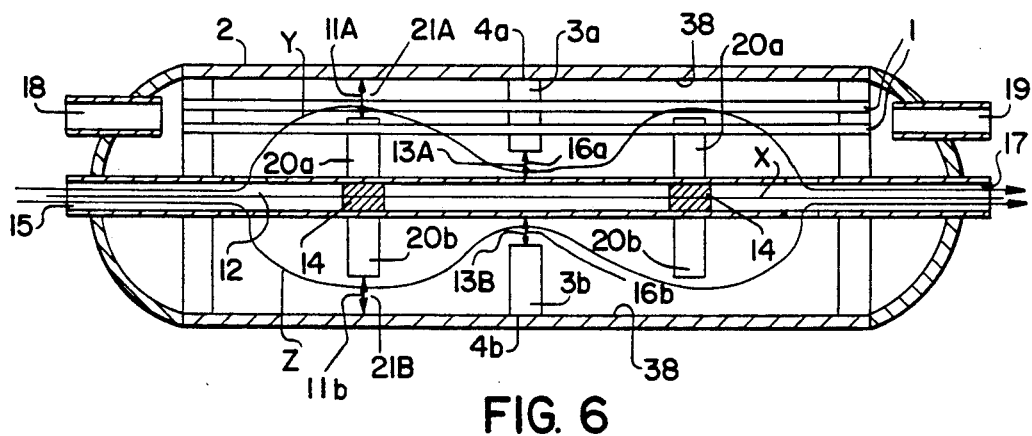
FIG. 6 is a schematic drawing of a module according to the invention which contains a mandrel and one perimeter sealing means, spaced apart between two axial sealing means each having an adjacent core plug.

FIG. 6 is a schematic drawing of a module having two radially-symmetrical disc-shaped axial sealing means (20a, 20b) spaced apart along the axis (x), each axial sealing means (20a, 20b) extending from the surface of the mandrel (12) to a distance (11a, 11b) away from the cylindrical housing interior (38), and having a core plug (14) which is provided in the bore of the mandrel (12) at the point where each of the axial sealing means meets the surface of the mandrel (12); and interposed between them, spaced apart along the axis (x), one radially-symmetrical disc-shaped perimeter sealing means (3a, 3b) which extends from the perimeter (4a, 4b) of the bundle (1) to a distance (13a, 13b) from the mandrel (12). Optionally (not shown), a core plug (14) is provided in the bore of the mandrel (12) at the point where the perimeter sealing means (3a, 3b) approaches the surface of the mandrel (12). This core plug is not strictly required, however, because the other two core plugs (14) will substantially block the bore of the mandrel (12). In this case, as shown by the arrows (y, z) feed enters the upstream mandrel port (15), is forced radially outward into the shell-side by the upstream axial sealing means (20a, 20b), passes through the unobstructed perimeter sub-portion (21a, 21b) of the bundle (1), is then forced back toward the mandrel (12) by the perimeter sealing means (3a, 3b), passes through the unobstructed axial sub-portion (16a, 16b) of the bundle (1) (and through the bore of the mandrel (12) if no core plug is included at the point where the perimeter sealing means (3a, 3b) approaches the surface of the mandrel (12)), is then forced radially outward into the shell-side by the downstream axial sealing means (20a, 20b), and finally exits through the downstream mandrel port (17). Permeate is collected in the lumen-side and withdrawn through the off-center lumen ports (18, 19) at one or both ends of the bundle (1). Alternatively (not shown), feed can be introduced in the lumen-side at one of the off-center lumen ports (18, 19) at the ends of the bundle (1), and a sweep fluid can be introduced through the upstream mandrel port (15) or downstream mandrel port (17), to carry away permeate.

Figure 7:
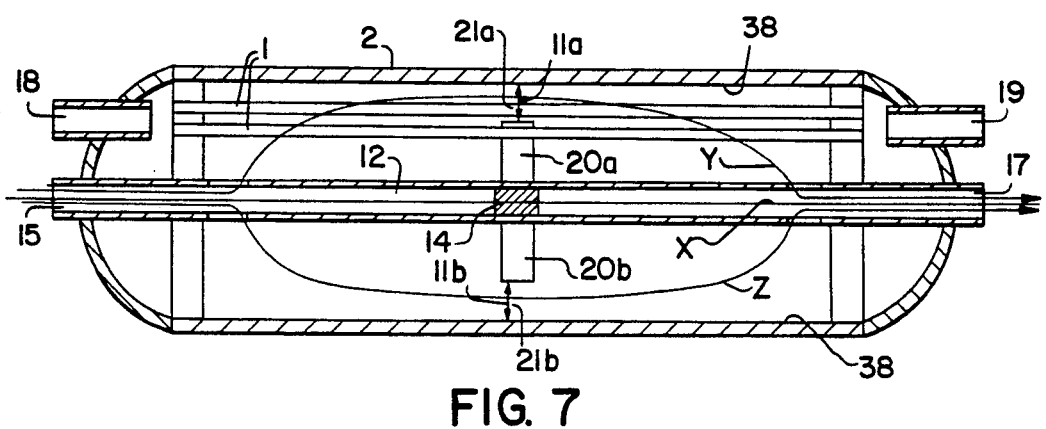
FIG. 7 is a schematic drawing of a module according to the invention which contains a mandrel and one axial sealing means having an adjacent core plug.

Turning to FIG. 7, a schematic drawing of a module is shown, in which hollow fiber fabric bundle (1) is contained in housing (2), surrounding mandrel (12). A single radially-symmetrical disc-shaped axial sealing means (20a, 20b) extends from the surface of the mandrel (12) to a distance (11a, 11b) from the cylindrical housing interior (38), and a core plug (14) is provided in the bore of the mandrel (12) at the point where the axial sealing means meets the surface of the mandrel (12). As shown by the arrows (y, z), feed fluid enters the upstream mandrel port (15), is forced radially outward by the core plug (14) and axial sealing means (20a, 20b) into the shell-side of the bundle (1), passes through the unobstructed perimeter sub-portion (21a, 21b) of the bundle (1), and exits through the downstream mandrel port (17). Again, since there is no blockage in the bore of the mandrel (12) downstream of the single core plug (14), the core plug (14) is preferably located near the downstream mandrel port (17) to minimize stagnant areas in the shell-side flow. Permeate is collected in the lumen-side and withdrawn through the off-center lumen ports (18, 19) at one or both ends of the bundle (1). Alternatively (not shown), feed can be introduced in the lumen-side at one of the off-center lumen ports (18, 19) at the ends of the bundle (1), and a sweep fluid can be introduced through the upstream mandrel port (15) or downstream mandrel port (17) to carry away permeate.

Figure 8:
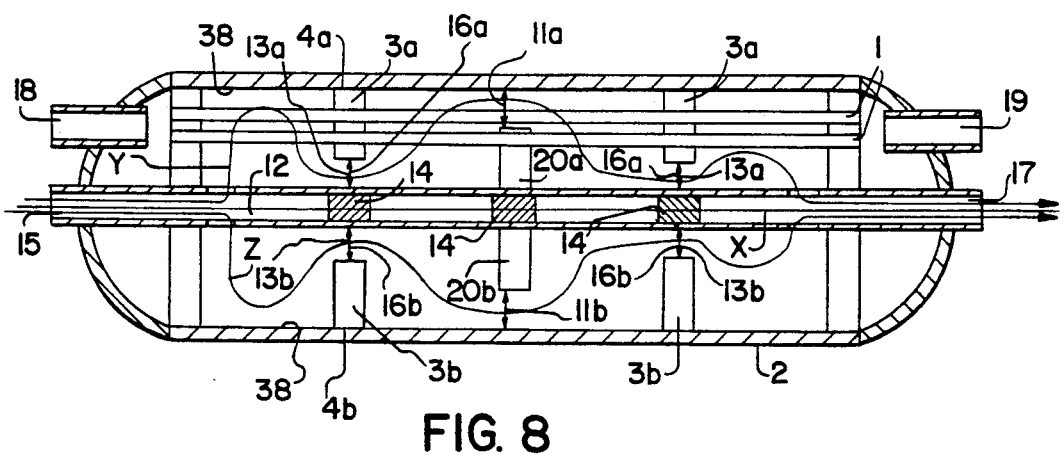
FIG. 8 is a schematic drawing of a module according to the invention which contains a mandrel and one axial sealing means having an adjacent core plug, spaced apart between two perimeter sealing means each having an adjacent core plug.

Referring next to FIG. 8, a schematic drawing is given of a module having two radially-symmetrical disc-shaped perimeter sealing means (3a, 3b) spaced apart along the axis (x), each perimeter sealing means (3a, 3b) extending from the perimeter (4a, 4b) of the bundle (1) to a distance (13a, 13b) from the mandrel (12), and having core plugs (14) provided in the bore of the mandrel (12) at the points where each perimeter sealing means (3a, 3b) approaches the surface of the mandrel (12); and interposed between them, spaced apart along the axis (x), one radially-symmetrical disc-shaped axial sealing means (20a, 20b) extending from the surface of the mandrel (12) to a distance (11a, 11b) away from the cylindrical housing interior (38), and having a core plug (14) which is provided in the bore of the mandrel (12) at the point where the axial sealing means meets the surface of the mandrel (12). In this case, as shown by the arrows (y, z) feed enters the upstream mandrel port (15), is forced out of the bore of the mandrel (12) by the core plug (14) adjacent the upstream perimeter sealing means (3a, 3b) and through the unobstructed axial sub-portion (16a, 16b) of the bundle (1), is then forced radially outward into the shell-side by the axial sealing means (20a, 20b), passes through the unobstructed perimeter sub-portion (21a, 21b) of the bundle (1), is then forced back toward the mandrel (12) by the downstream perimeter sealing means (3a, 3b), passes through the unobstructed axial sub-portion (16a, 16b) of the bundle (1), and finally exits through the downstream mandrel port (17). Permeate is collected in the lumen-side and withdrawn through the off-center lumen ports (18, 19) at one or both ends of the bundle (1). Alternatively (not shown), feed can be introduced in the lumen-side at one of the off-center lumen ports (18, 19) at the ends of the bundle (1), and a sweep fluid can be introduced through one end of the mandrel (12) to carry away permeate.

Figure 9:
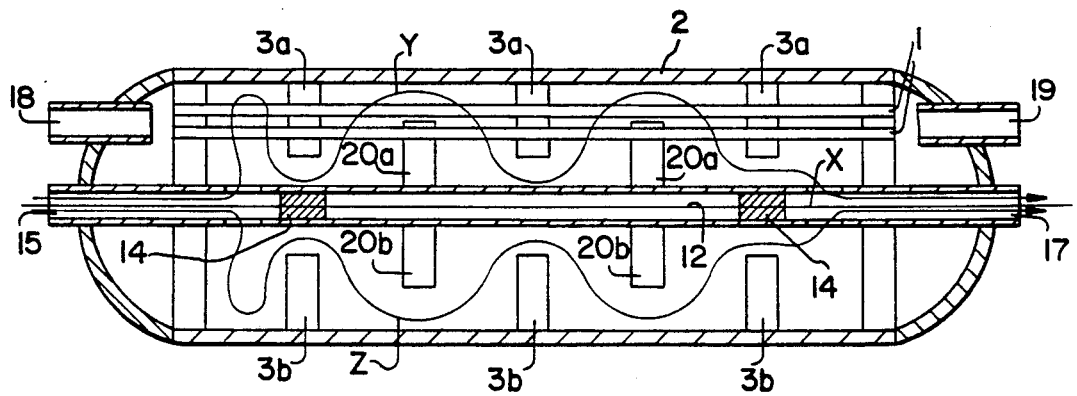
FIG. 9 is a schematic drawing of a module according to the invention (a variation on FIG. 8) which contains a mandrel and two axial sealing means, spaced apart between three perimeter sealing means, the outside two each having an adjacent core plug.
Figure 10:
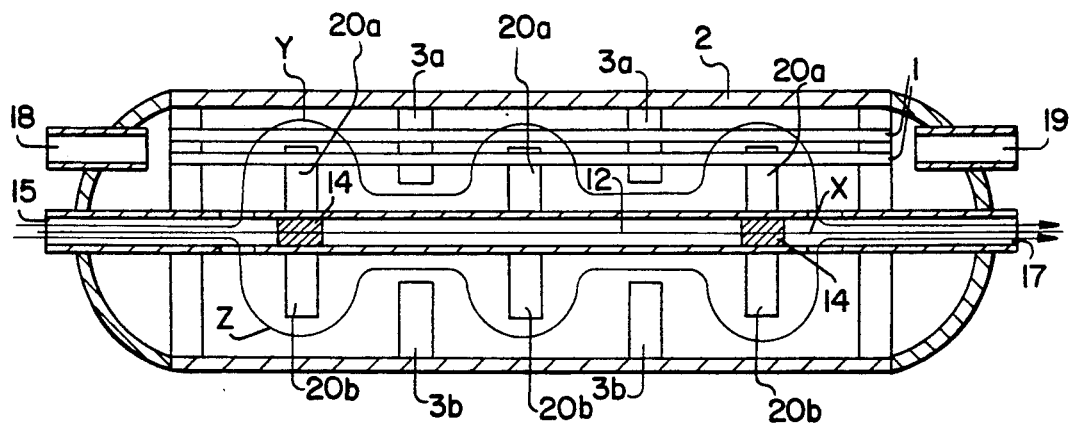
FIG. 10 is a schematic drawing of a module according to the invention (a variation on FIG. 6) which contains a mandrel and two perimeter sealing means, spaced apart between three axial sealing means, the outside two each having an adjacent core plug.

FIG. 9 schematically illustrates an embodiment of the invention which is similar to that shown in FIG. 8, except that one additional axial sealing means (20a, 20b) and one additional perimeter sealing means (3a, 3b) have been added. FIG. 10, analogously, schematically illustrates an embodiment of the invention which is similar to that shown in FIG. 6, except that one additional axial sealing means (20a, 20b) and one additional perimeter sealing means (3a, 3b) have been added. The shell-side fluid flows are shown by arrows (y, z). In principle, any number of axial- and perimeter-sealing means may be combined in equal or unequal numbers and in alternating or random order along the axis. Each additional sealing means and adjacent core plug, however, increases the pressure drop from the feed introduction to and withdrawal from the bundle (1). Hence, the benefits of increasing cross flow have to be balanced against operating pressures and corresponding operating costs and flow volume. These are matters of conventional fluid flow dynamics which can be readily evaluated on a case-by-case basis by those skilled in the art.

Figure 11:
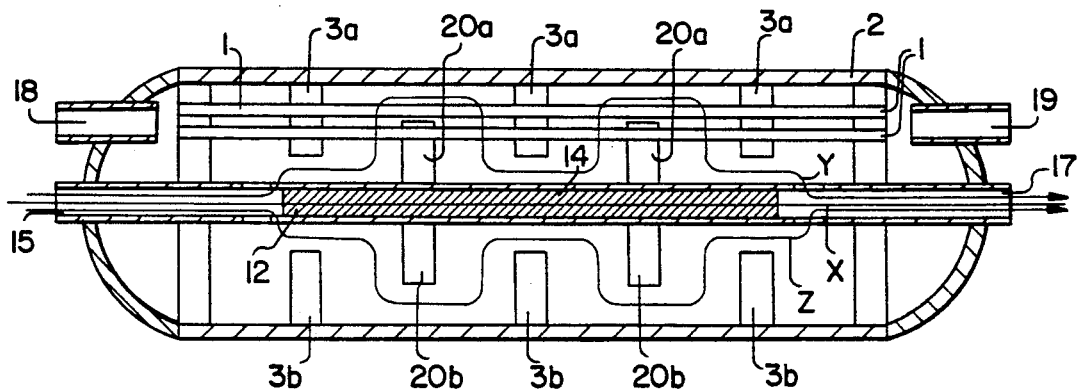
FIG. 11 is a schematic drawing of a module according to the invention (a variation on FIG. 8) which contains a mandrel, one extended core plug, and two axial sealing means spaced apart along the core plug between three perimeter sealing means.

FIG. 11 illustrates an embodiment of the invention including a single core plug (14) extending continuously along most of the length of the bundle (1), together with two axial sealing means (20a, 20b) which are spaced out along the length of the core plug (14) and in between three perimeter sealing means (3a, 3b) spaced out along the axis (x). As shown by the arrows (y, z), feed fluid enters the upstream mandrel port (15), and is alternately forced toward the core plug (14) by the perimeter sealing means (3a, 3b), and then radially outward into the shell-side by the core plug (14) and axial sealing means (20a, 20b). Permeate is collected in the lumen-side and withdrawn through the off-center lumen ports (18, 19) at one or both ends of the bundle (1). Alternatively (not shown), feed can be introduced in the lumen-side through one of the off-center lumen ports (18, 19) at the ends of the bundle (1), and a sweep fluid can be introduced through one end of the mandrel (12), to carry away permeate.

Figure 12:
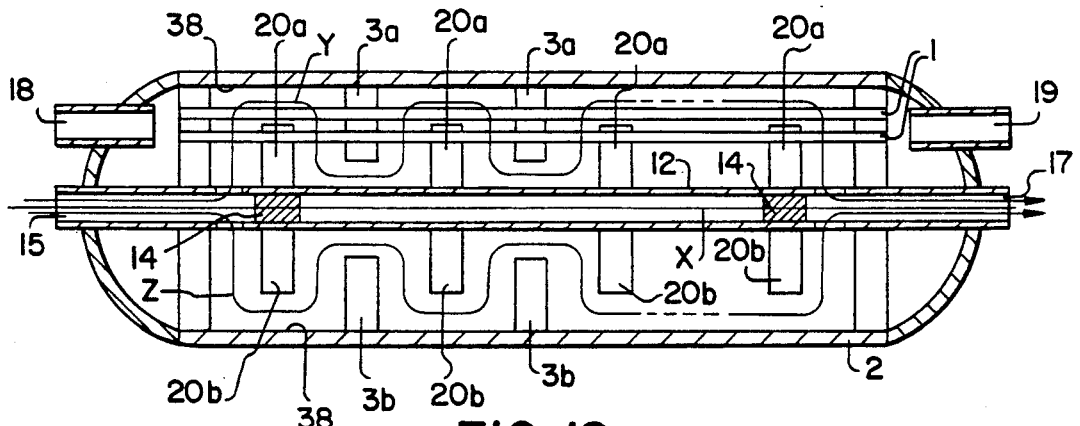
FIG. 12 is a schematic drawing of a module according to the invention (a variation on FIG. 10) in which the perimeter sealing means extend almost to the mandrel, and the axial sealing means extend almost to the cylindrical housing interior.

FIG. 12 illustrates an embodiment of the invention (a variation on that depicted in FIG. 10) in which the plurality (N can be any whole number greater than zero) of perimeter sealing means (3a, 3b) extend almost to the mandrel (12), and the plurality of axial sealing means (20a, 20b) extend almost to the cylindrical housing interior (38). The shell-side fluid flows are shown by arrows (y, z). This embodiment is provided to illustrate that the axial- and perimeter-sealing means according to the invention can extend to various lengths within the bundle (1), (which may be equal or variable within a given module) as desired in specific cases. As the sealing means are extended and the corresponding axial- and perimeter-sub-portions become smaller, shell-side crossflow and pressure drop both increase. Again, the pressure drops in specific cases are determined by conventional fluid flow dynamics.

Figure 13:
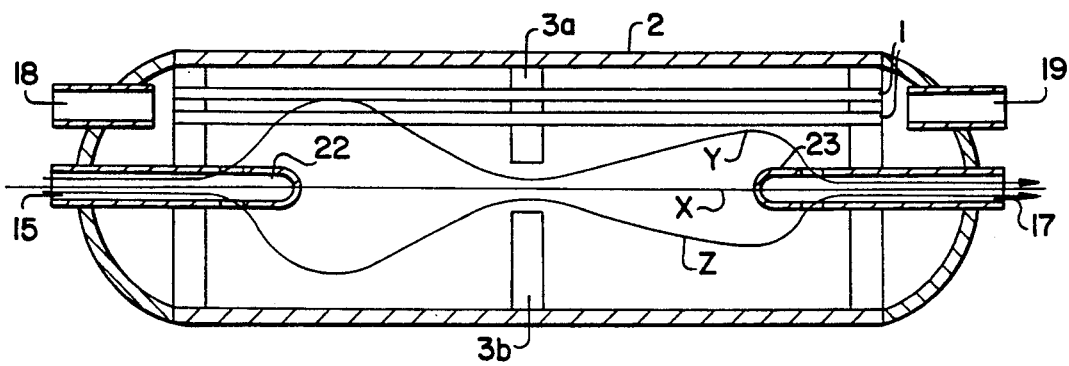
FIG. 13 is a schematic drawing of a module according to the invention (a variation on FIG. 1) with the addition of partial mandrels (mandrelettes) extending from each bundle end partially along the axis into the bundle.
Figure 14:
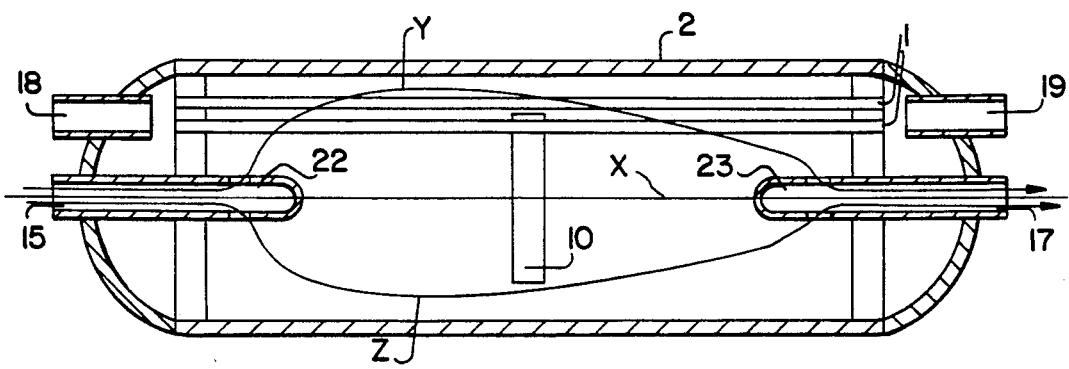
FIG. 14 is a schematic drawing of a module according to the invention (a variation on FIG. 2) with the addition of partial mandrels (mandrelettes) extending from each bundle end partially along the axis into the bundle.
Figure 15:
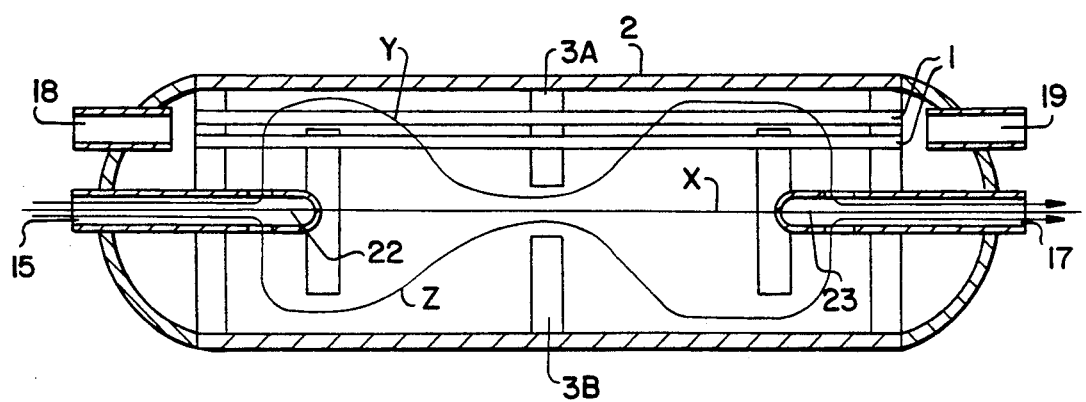
FIG. 15 is a schematic drawing of a module according to the invention (a variation on FIG. 4) with the addition of partial mandrels (mandrelettes) extending from each bundle end partially along the axis into the bundle.

FIGS. 13-15 schematically illustrate modifications of the embodiments shown in FIGS. 1, 2 and 4, respectively in which mandrel-like core tubes (22, 23) extending partially into the axis of the bundle (1) are provided. The shell-side fluid flows are shown by arrows (y, z). These embodiments will allow correspondingly increased space in the bundle (1) for shell-side fluid flow, hence reducing the shell-side pressure drop.

Figure 16:
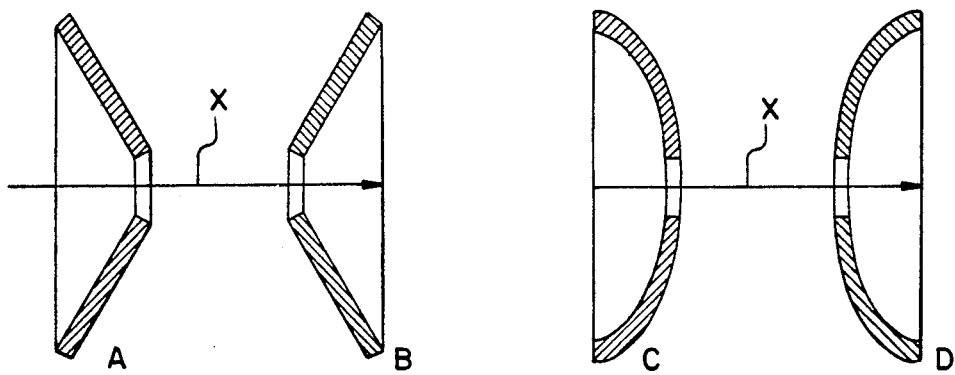
FIG. 16-A is a schematic drawing of a right-facing modified sealing means (either axial or perimeter) which is funnel-shaped with straight sides.

Although the discussion above has been directed to sealing means in planar disc form oriented perpendicular to the module axis, the invention contemplates, where desired, providing sealing means having other shapes which are axially-symmetrical and rotationally symmetrical about the axis. FIGS. 16-A and -B illustrate such a sealing means in the form of a cone having straight sides, facing downstream and upstream, respectively; and FIG. 16-C and -D illustrate such a sealing means in the form of a cone having curved sides, facing downstream and upstream, respectively. These embodiments can be provided as axial- and/or perimeter-sealing means.

Figure 17:
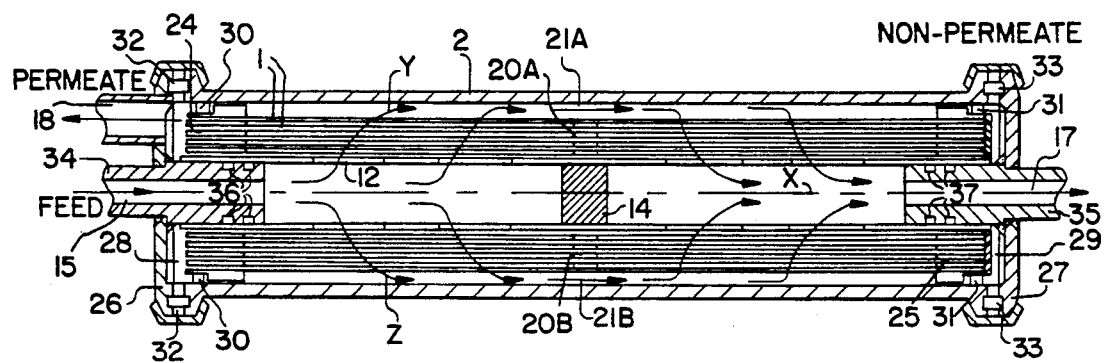
FIG. 17 is a cross-sectional drawing of a module which is similar to that of FIG. 7, except that here there is only one lumen port.
Figure 18:
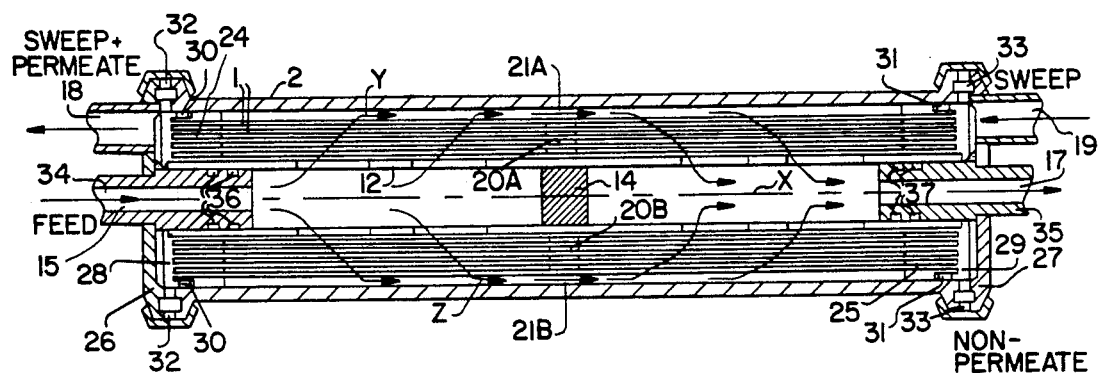
FIG. 18 is a cross-sectional drawing of a module according to FIG. 7, including lumen ports at both ends of the bundle.

FIG. 17 is a cross-sectional drawing of a module based on the module illustrated in FIG. 7, except that FIG. 17 has only one lumen port (18) at one end of the bundle. This drawing shows a plurality of hollow fibers in the bundle (1), drawn much larger than scale. The bundle (1) surrounds a mandrel (12) centered on the axis (x), and is contained by a housing (2). At the midpoint of the mandrel (12) is a core plug (14), and adjacent thereto, an axial sealing means (20a, 20b). The bundle (1) is potted at both ends in tube sheets (24, 25). End caps (26, 27) are fitted over the tube sheets (24, 25) forming chambers (28, 29). The housing (2) is fitted at both ends with o-rings (30, 31) in sealing engagement with the tube sheets (24, 25); and o-rings (32, 33) in sealing engagement with the end caps (26, 27). The mandrel (12) is fitted at both ends with tubes (34, 35) which are each fitted with two o-rings (36, 37) in sealing engagement with the bore of the mandrel (12) which respectively serve to guide feed fluid from the upstream mandrel port (15) into the mandrel (12), and from the mandrel (12) to the downstream mandrel port (17). As shown by the arrows (y, z), feed fluid enters the mandrel (12) through the upstream mandrel port (15), and is forced radially through the shell-side of the bundle (1) by the core plug (14) and axial sealing means (20a, 20b). The fluid flows through the unobstructed perimeter sub-portion (21a, 21b) of the bundle (1), and flows inwardly toward the mandrel (12) to exit as concentrate through the downstream mandrel port (17). Permeate is collected at the lumen-side port (8). FIG. 18 is identical to FIG. 17, except that a second lumen port (19) has been added at the downstream end of the bundle (1). This modification makes it possible to introduce a sweep fluid at one of the lumen ports (18) and (19), and to withdraw it, together with feed fluid components that have permeated from the shell-side space through the membrane, at the other one of the lumen ports.

There are several additional important considerations to be addressed in fabricating the cartridges and modules of the invention. First, cartridges can be either cast-in-place or intended to be inserted in a pressure housing. Cast-in-place modules include a bundle and integrally-formed housing; they are self-contained and completely disposable. Such modules are relatively simple to fabricate; they are intended for low pressure applications and are often used where small modules are needed, e.g., for analytical-scale operations. Conventional cast-in-place modules containing hollow fiber bundles are commercially available and well-known. Cast-in-place modules according to the invention can be made by the steps of: (1) starting with (a) a bundle prepared as discussed above, and (b) a conventional cast-in-place housing, which is generally made of plastic and shaped similarly to the housing illustrated in FIG. 17; (2) inserting the bundle into the housing; (3) potting both of the bundle ends after sealing the bundle ends with a potting cup clamped over each end of the housing; and (4) providing suitable end caps and ports. For commercial-scale applications, high operating pressures are normally required; as a result, the cartridges must be contained by a high-pressure housing generally fabricated of metal, e.g., stainless steel. Such housings are expensive and are not disposable. Generally, the same fabrication steps are carried out as for cast-in-place modules.

Second, careful attention should be paid to the potting process. Conventionally, potting is facilitated either by gravity or centrifugal force. In either case, at least one port must be provided on the cylindrical exterior of the housing communicating with the shell-side space, to allow introduction of the resinous potting material. In gravity potting, the resinous potting material is introduced into each bundle end, one at a time, and allowed to settle into the end of the bundle and cure. In centrifugal potting, the bundle is inserted into the housing, the assembly is spun on its midpoint to create centrifugal force at both bundle ends, resinous potting material is introduced into the shell-side space near both bundle ends, and the resinous potting material is allowed to cure. Centrifugal potting is generally not practical where pressure housings are used, because of the substantial weight of the housings.

When potting a relatively large cartridge, e.g. having a radial diameter of about four inches or greater, heat released by exothermic resinous potting material curing may damage the hollow fibers and render the cartridge inoperable. Further, if the viscosity of the resinous potting material is too high, the resinous potting material may not flow evenly through the bundle end. Further, both the centrifugal and gravity potting techniques necessitate at least one shell-side port on the side of the housing. If such ports are to be used in later module operation, multiple modules cannot be connected in series without exterior piping or specially-designed pressure housings. Hence, the centrifugal and gravity potting techniques may be unacceptable.

In such cases, according to preferred embodiments of the invention, potting is accomplished by forming the tube sheets for the bundle ends simultaneously with the formation of all axial- and perimeter-sealing means as the bundle is wound, instead of employing a subsequent potting step. This potting operation is accomplished by putting down continuous resinous potting material lines at both bundle ends beginning at the unwound edge of the fabric facing and adjacent the nip with the axis, and proceeding along the fabric edge, forming continuous tube sheets at both bundle ends extending to the perimeter of the bundle. The width of the tube sheets is generally greater than the width of the axial-and perimeter-sealing means, because the tube sheets must withstand the full operating pressure of the cartridge. As needs dictate, the resinous potting materials used to form the sealing means and tube sheets can be the same or different. The bundle ends can be sealed to the cylindrical housing interior as needed, by simply applying an appropriate amount of resinous potting material to the edge adjacent the bundle ends. Alternatively, a ring-shaped fitting designed to tightly rest against the end of the cylindrical housing interior can be fabricated (e.g., injection molded), and adhesively attached to the edge adjacent the bundle end.

Third, referring back to FIG. 1, shell-side fluid must be prevented from exterior channeling whenever a bundle includes one or more perimeter sealing means—i.e., flow along the outside perimeter of the bundle. This is accomplished by providing impermeable wrapping means covering the exterior cylindrical surface of the bundle. This can be either a coating or web-like impermeable layer or equivalent means affixed to the exterior cylindrical surface of the bundle. When such a wrapping means is present, perimeter sealing means are placed in sealing engagement with the impermeable wrapping means. In embodiments where no mandrel is present, an opening must be provided in the impermeable wrapping means to allow at least one port ("shell-side access means") communicating with the shell-side space, to be placed on the side of the bundle. The edges of the impermeable wrapping means surrounding the shell-side access means should be sealed to the shell-side access means to prevent leakage from the shell-side space.

The spiral-type hollow fiber membrane fabric-containing cartridges and modules of the invention are generally operated in a manner similar to conventional cartridges and modules. Accordingly, suitable operating procedures are disclosed in the following U.S. patents which are hereby incorporated by reference: Banner U.S. Pat. No. 4,758,341; Holland U.S. Pat. No. 4,855,058; and Caskey U.S. Pat. No. 4,961,760. More particularly, a fluid can be introduced into the bundle lumens at either or both potted ends, and allowed to diffuse out of the fibers into the shell-side region. The permeated fluid can then be collected at either the mandrel (through the perforations) or at the cartridge perimeter, or both. Alternatively, a fluid can be introduced at one or both ends of the mandrel through the bore and allowed to diffuse through the mandrel perforations into the shell-side region. Fluid which permeates through the fibers into their lumens can then be collected at one or both of the potted bundle ends; and concentrate remaining in the shell-side region can be collected at the cartridge perimeter. Ports to facilitate these permutations can be built into the module housing at the bundle ends and on the cylindrical exterior of the housing as needed.

End use applications for the spiral-type hollow fiber membrane fabric-containing cartridges and modules of the invention include the end uses for conventional cartridges and modules as disclosed in the art. For example, the end uses disclosed in the following U.S. patents, which are hereby incorporated by reference, are contemplated: Holland U.S. Pat. No. 4,855,058; Baurmeister U.S. Pat. No. 4,940,617; and Caskey U.S. Pat. No. 4,961,760. In general, gaseous fluids will flow more evenly and freely through the bundle than liquids, whose resistance to free flow increases with viscosity. Accordingly, it is generally advisable to employ a cartridge or module having increasingly numerous and effective sealing means promoting radial flow through the shell-side as the feed fluid viscosity increases.

While several embodiments of the invention have been illustrated and described above, it is not intended to be limited to the details shown, since various modifications and structural changes may be made without departing from the spirit of the present invention, which is defined by the claims below.

What is claimed as new and desired to be protected by Letters Patent is set forth in the appended claims:

1. In a method of fabricating a spiral-type hollow fiber membrane fabric-containing cartridge, comprising the following steps:
   a. forming a plurality of hollow fiber membranes each having a lumen, into a fabric-like array in which the hollow fibers substantially are mutually-parallel and constitute the fabric weft, and are held in spaced-apart relationship by filaments constituting the fabric warp; then
   b. winding the array upon an axis which is substantially parallel to the hollow fibers into a spirally-wound membrane bundle having two bundle ends and a cylindrical exterior surface; then
   c. potting each of the two bundle ends in resinous potting material serving to seal the bundle end into an adjacent monolithic tube sheet, a portion of the bundle between the two tube sheets being free from potting material to form a shell-side region; then
   d. exposing the lumen ends of the hollow fibers constituting at least a first one of the bundle ends to communicate with the exterior of the bundle;

the improvement comprising:
   e. subsequent to step (b), covering the cylindrical exterior surface of the bundle with an impermeable wrapping means; and
   f. simultaneously with step (b), forming at least one axially-symmetrical sealing means from resinous potting material within the shell-side region in a shape which is rotationally symmetrical about the axis, said sealing means being in sealing engagement with the impermeable wrapping means and extending to a distance away from the axis, forming an axial sub-portion of the shell-side region which is unobstructed to fluid flow, said sealing means dividing the shell-side region into two shell-side portions in mutual fluid communication through the sub-portion.

2. In a method of fabricating a spiral-type hollow fiber membrane fabric-containing cartridge, comprising the following steps:
   a. forming a plurality of hollow fiber membranes each having a lumen, into a fabric-like array in which the hollow fibers substantially are mutually-parallel and constitute the fabric weft, and are held in spaced-apart relationship by filaments constituting the fabric warp; then b. forming a spirally-wound membrane bundle having two bundle ends and a cylindrical exterior surface, by winding the array upon a hollow mandrel having a longitudinal axis and a cylindrical exterior surface, an axial bore, and perforations along the surface which communicate with the bore, such that the axis is substantially parallel to the hollow fibers; then c. potting each of the two bundle ends in resinous potting material serving to seal the bundle end into an adjacent monolithic tube sheet, a portion of the bundle between the two tube sheets being free from potting material to form a shell-side region; then d. exposing the lumen ends of the hollow fibers constituting at least a first one of the bundle ends to communicate with the exterior of the bundle; then the improvement comprising:

e. subsequent to step (b), covering the cylindrical exterior surface of the bundle with an impermeable wrapping means; and f. simultaneously with step (b), forming at least one axially-symmetrical sealing means from resinous potting material within the shell-side region in a shape which is rotationally symmetrical about the axis, said sealing means being in sealing engagement with the impermeable wrapping means and extending to a distance away from the mandrel, forming an axial sub-portion of the shell-side region which is unobstructed to fluid flow, said sealing means dividing the shell-side region into two shell-side portions in mutual fluid communication through the sub-portion; and g. completely obstructing the axial bore where the mandrel intersects the axial sub-portion.

3. In a method of fabricating a spiral-type hollow fiber membrane fabric-containing cartridge, comprising the following steps:

a. forming a plurality of hollow fiber membranes each having a lumen, into a fabric-like array in which the hollow fibers substantially are mutually-parallel and constitute the fabric weft, and are held in spaced-apart relationship by filaments constituting the fabric warp; then b. winding the array upon an axis which is substantially parallel to the hollow fibers into a spirally-wound membrane bundle having two bundle ends and a cylindrical exterior surface; then c. potting each of the two bundle ends in resinous potting material serving to seal the bundle end into an adjacent monolithic tube sheet, a portion of the bundle between the two tube sheets being free from potting material to form a shell-side region; then d. exposing the lumen ends of the hollow fibers constituting at least a first one of the bundle ends to communicate with the exterior of the bundle; then the improvement comprising:

e. simultaneously with step (b), forming at least one axially-symmetrical sealing means from resinous potting material within the shell-side region in a shape which is rotationally symmetrical about the axis, said sealing means intersecting the axis and extending to a perimeter which is located at a distance away from said cylindrical exterior surface, forming a sub-portion of the shell-side region between said cylindrical exterior surface and the perimeter of the sealing means which is unobstructed to fluid flow, said sealing means dividing the shell-side region into two shell-side portions in mutual fluid communication through the sub-portion.

4. In a method of fabricating a spiral-type hollow fiber membrane fabric-containing cartridge, comprising the following steps:

a. forming a plurality of hollow fiber membranes each having a lumen, into a fabric-like array in which the hollow fibers substantially are mutually-parallel and constitute the fabric weft, and are held in spaced-apart relationship by filaments constituting the fabric warp; then b. forming a spirally-wound membrane bundle having two bundle ends and a cylindrical exterior surface, by winding the array upon a hollow mandrel having a longitudinal axis and a cylindrical exterior surface, an axial bore, and perforations along the surface which communicate with the bore, such that the axis is substantially parallel to the hollow fibers; then c. potting each of the two bundle ends in resinous potting material serving to seal the bundle end into an adjacent monolithic tube sheet, a portion of the bundle between the two tube sheets being free from potting material to form a shell-side region; then d. exposing the lumen ends of the hollow fibers constituting at least a first one of the bundle ends to communicate with the exterior of the bundle; then the improvement comprising:

e. simultaneously with step (b), forming at least one axially-symmetrical sealing means within the shell-side region from resinous potting material in a shape which is rotationally symmetrical about the axis, said sealing means being in sealing engagement with the mandrel and extending to a perimeter which is located at a distance away from said cylindrical exterior surface, forming a sub-portion of the shell-side region between said cylindrical exterior surface and the perimeter of the sealing means which is unobstructed to fluid flow, said sealing means dividing the shell-side region into two shell-side portions in mutual fluid communication through the sub-portion; and f. completely obstructing the axial bore at the point where the sealing means is in sealing engagement with the mandrel.

5. In a method of fabricating a spiral-type hollow fiber membrane fabric-containing cartridge, comprising the following steps:

a. forming a plurality of hollow fiber membranes each having a lumen, into a fabric-like array in which the hollow fibers substantially are mutually-parallel and constitute the fabric weft, and are held in spaced-apart relationship by filaments constituting the fabric warp; then b. forming a spirally-wound membrane bundle having two bundle ends and a cylindrical exterior surface, by winding the array upon a hollow mandrel having a longitudinal axis and a cylindrical exterior surface, an axial bore, and perforations along the surface which communicate with the bore, such that the axis is substantially parallel to the hollow fibers; then c. potting each of the two bundle ends in resinous potting material serving to seal the bundle end into an adjacent monolithic tube sheet, a portion of the bundle between the two tube sheets being free from potting material to form a shell-side region; then d. exposing the lumen ends of the hollow fibers constituting at least a first one of the bundle ends to communicate with the exterior of the bundle; then the improvement comprising:

e. subsequent to step (b), covering the cylindrical exterior surface of the bundle with an impermeable wrapping means; and f. simultaneously with steps (b) and (h), forming at least two axially-symmetrical perimeter sealing means from resinous potting material within the shell-side region, each having a shape which is rotationally symmetrical about the axis, said perimeter sealing means being spaced apart from each other along the axis, each in sealing engagement with the impermeable wrapping means and extending to a distance away from the mandrel, each forming an axial sub-portion of the shell-side region which is unobstructed to fluid flow, said perimeter sealing means dividing the shell-side region into a plurality of shell-side portions in mutual fluid communication through the axial sub-portions;

g. completely obstructing the axial bore where the mandrel intersects the axial sub-portions;

h. simultaneously with steps (b) and (f), forming at least one axially-symmetrical axial sealing means from resinous potting material within the shell-side region in a shape which is rotationally symmetrical about the axis, said axial sealing means being interposed between two perimeter sealing means, said axial sealing means being in sealing engagement with the mandrel and extending to a perimeter which is located at a distance away from said cylindrical exterior surface, forming a perimeter sub-portion of the shell-side region between said cylindrical exterior surface and the perimeter of the axial sealing means which is unobstructed to fluid flow, said axial sealing means dividing the shell-side region into two shell-side portions in mutual fluid communication through the perimeter sub-portion; and i. completely obstructing the axial bore at the point where the axial sealing means is in sealing engagement with the mandrel.

6. In a method of fabricating a spiral-type hollow fiber membrane fabric-containing cartridge, comprising the following steps:

a. forming a plurality of hollow fiber membranes each having a lumen, into a fabric-like array in which the hollow fibers substantially are mutually-parallel and constitute the fabric weft, and are held in spaced-apart relationship by filaments constituting the fabric warp; then b. forming a spirally-wound membrane bundle having two bundle ends and a cylindrical exterior surface, by winding the array upon a hollow mandrel having a longitudinal axis and a cylindrical exerior surface, an axial bore, and perforations along the surface which communicate with the bore, such that the axis is substantially parallel to the hollow fibers; then c. potting each of the two bundle ends in resinous potting material serving to seal the bundle end into an adjacent monolithic tube sheet, a portion of the bundle between the two tube sheets being free from potting material to form a shell-side region; then d. exposing the lumen ends of the hollow fibers constituting at least a first one of the bundle ends to communicate with the exterior of the bundle; then the improvement comprising:

e. subsequent to step (b), covering the cylindrical exterior surface of the bundle with an impermeable wrapping means; and f. simultaneously with steps (b) and (h), forming at least two axially-symmetrical axial sealing means from resinous potting material within the shell-side region, each having a shape which is rotationally symmetrical about the axis, said axial sealing means being spaced apart from each other along the axis, each of said axial sealing means being in sealing engagement with the mandrel and extending to a perimeter which is located at a distance away from said cylindrical exterior surface, each forming a perimeter sub-portion of the shell-side region between said cylindrical exterior surface and the perimeter of the axial sealing means which is unobstructed to fluid flow, said axial sealing means dividing the shell-side region into a plurality of shell-side portions in mutual fluid communication through the perimeter sub-portions;

g. completely obstructing the axial bore at the point where each axial sealing means is in sealing engagement with the mandrel;

h. simultaneously with steps (b) and (f), forming at least one axially-symmetrical perimeter sealing means from resinous potting material within the shell-side region in a shape which is rotationally symmetrical about the axis, said perimeter sealing means being interposed between two axial sealing means, and in sealing engagement with the impermeable wrapping means and extending to a distance away from the mandrel, forming an axial sub-portion of the shell-side region which is unobstructed to fluid flow, said perimeter sealing means dividing the shell-side region into two shell-side portions in mutual fluid communication through the axial sub-portion; and i. completely obstructing the axial bore where the mandrel intersects the axial sub-portion.

7. In a method of fabricating a spiral-type hollow fiber membrane fabric-containing cartridge, comprising the following steps:

a. forming a plurality of hollow fiber membranes each having a lumen, into a fabric-like array in which the hollow fibers substantially are mutually-parallel and constitute the fabric weft, and are held in spaced-apart relationship by filaments constituting the fabric warp; then b. winding the array upon an axis which is substantially parallel to the hollow fibers into a spirally-wound membrane bundle having two bundle ends and a cylindrical exterior surface; then c. exposing the lumen ends of the hollow fibers constituting at least a first one of the bundle ends to communicate with the exterior of the bundle;

the improvement comprising:

d. subsequent to step (b), covering the cylindrical exterior surface of the bundle with an impermeable wrapping means; and e. simultaneously with steps (b) and (f), forming at least one axially-symmetrical sealing means from resinous potting material within the shell-side region in a shape which is rotationally symmetrical about the axis, said sealing means being in sealing engagement with the impermeable wrapping means and extending to a distance away from the axis, forming an axial sub-portion of the shell-side region which is unobstructed to fluid flow, said sealing means dividing the shell-side region into two shell-side portions in mutual fluid communication through the sub-portion;

f. simultaneously with steps (b) and (e), forming a tube sheet at each of the two bundle ends from resinous potting material, serving to seal each bundle end into an adjacent monolithic tube sheet, a portion of the bundle between the two tube sheets being free from potting material to form a shell-side region.

8. In a method of fabricating a spiral-type hollow fiber membrane fabric-containing cartridge, comprising the following steps:

a. forming a plurality of hollow fiber membranes each having a lumen, into a fabric-like array in which the hollow fibers substantially are mutually-parallel and constitute the fabric weft, and are held in spaced-apart relationship by filaments constituting the fabric warp; then b. forming a spirally-wound membrane bundle having two bundle ends and a cylindrical exterior surface, by winding the array upon a hollow mandrel having a longitudinal axis and a cylindrical exterior surface, an axial bore, and perforations along the surface which communicate with the bore, such that the axis is substantially parallel to the hollow fibers; then c. exposing the lumen ends of the hollow fibers constituting at least a first one of the bundle ends to communicate with the exterior of the bundle;

the improvement comprising:

d. subsequent to step (b), covering the cylindrical exterior surface of the bundle with an impermeable wrapping means; and e. simultaneously with steps (b) and (g), forming at least one axially-symmetrical sealing means from resinous potting material within the shell-side region in a shape which is rotationally symmetrical about the axis, said sealing means being in sealing engagement with the impermeable wrapping means and extending to a distance away from the mandrel, forming an axial sub-portion of the shell-side region which is unobstructed to fluid flow, said sealing means dividing the shell-side region into two shell-side portions in mutual fluid communication through the sub-portion;

f. completely obstructing the axial bore where the mandrel intersects the axial sub-portion; and g. simultaneously with steps (b) and (e), forming a tube sheet at each of the two bundle ends from resinous potting material, serving to seal each bundle end into an adjacent monolithic tube sheet, a portion of the bundle between the two tube sheets being free from potting material to form a shell-side region.

9. In a method of fabricating a spiral-type hollow fiber membrane fabric-containing cartridge, comprising the following steps:

a. forming a plurality of hollow fiber membranes each having a lumen, into a fabric-like array in which the hollow fibers substantially are mutually-parallel and constitute the fabric weft, and are held in spaced-apart relationship by filaments constituting the fabric warp; then b. winding the array upon an axis which is substantially parallel to the hollow fibers into a spirally-wound membrane bundle having two bundle ends and a cylindrical exterior surface; then c. exposing the lumen ends of the hollow fibers constituting at least a first one of the bundle ends to communicate with the exterior of the bundle;

the improvement comprising:

d. simultaneously with steps (b) and (e), forming at least one axially-symmetrical sealing means from resinous potting material within the shell-side region in a shape which is rotationally symmetrical about the axis, said sealing means intersecting the axis and extending to a perimeter which is located at a distance away from said cylindrical exterior surface, forming a sub-portion of the shell-side region between said cylindrical exterior surface and the perimeter of the sealing means which is unobstructed to fluid flow, said sealing means dividing the shell-side region into two shell-side portions in mutual fluid communication through the sub-portion; and e. simultaneously with steps (b) and (d), forming a tube sheet at each of the two bundle ends from resinous potting material, serving to seal each bundle end into an adjacent monolithic tube sheet, a portion of the bundle between the two tube sheets being free from potting material to form a shell-side region.

10. In a method of fabricating a spiral-type hollow fiber membrane fabric-containing cartridge, comprising the following steps:

a. forming a plurality of hollow fiber membranes each having a lumen, into a fabric-like array in which the hollow fibers substantially are mutually-parallel and constitute the fabric weft, and are held in spaced-apart relationship by filaments constituting the fabric warp; then b. forming a spirally-wound membrane bundle having two bundle ends and a cylindrical exterior surface, by winding the array upon a hollow mandrel having a longitudinal axis and a cylindrical exterior surface, an axial bore, and perforations along the surface which communicate with the bore, such that the axis is substantially parallel to the hollow fibers; then c. exposing the lumen ends of the hollow fibers constituting at least a first one of the bundle ends to communicate with the exterior of the bundle;

the improvement comprising:

d. simultaneously with steps (b) and (f), forming at least one axially-symmetrical sealing means from resinous potting material within the shell-side region in a shape which is rotationally symmetrical about the axis, said sealing means being in sealing engagement with the mandrel and extending to a perimeter which is located at a distance away from said cylindrical exterior surface, forming a sub-portion of the shell-side region between said cylindrical exterior surface and the perimeter of the sealing means which is unobstructed to fluid flow, said sealing means dividing the shell-side region into two shell-side portions in mutual fluid communication through the sub-portion; and e. completely obstructing the axial bore at the point where the sealing means is in sealing engagement with the mandrel; and f. simultaneously with steps (b) and (d), forming a tube sheet at each of the two bundle ends from resinous potting material, serving to seal each bundle end into an adjacent monolithic tube sheet, a portion of the bundle between the two tube sheets being free from potting material to form a shell-side region.

11. In a method of fabricating a spiral-type hollow fiber membrane fabric-containing cartridge, comprising the following steps:
   a. forming a plurality of hollow fiber membranes each having a lumen, into a fabric-like array in which the hollow fibers substantially are mutually-parallel and constitute the fabric weft, and are held in spaced-apart relationship by filaments constituting the fabric warp; then
   b. forming a spirally-wound membrane bundle having two bundle ends and a cylindrical exterior surface, by winding the array upon a hollow mandrel having a longitudinal axis and a cylindrical exterior surface, an axial bore, and perforations along the surface which communicate with the bore, such that the axis is substantially parallel to the hollow fibers; then
   c. exposing the lumen ends of the hollow fibers constituting at least a first one of the bundle ends to communicate with the exterior of the bundle;
the improvement comprising:
   d. subsequent to step (b), covering the cylindrical exterior surface of the bundle with an impermeable wrapping means;
   e. simultaneously with steps (b), (g), and (i), forming at least two axially-symmetrical perimeter sealing means from resinous potting material within the shell-side region, each having a shape which is rotationally symmetrical about the axis, said perimeter sealing means being spaced apart from each other along the axis, each in sealing engagement with the impermeable wrapping means and extending to a distance away from the mandrel, each forming an axial sub-portion of the shell-side region which is unobstructed to fluid flow, said perimeter sealing means dividing the shell-side region into a plurality of shell-side portions in mutual fluid communication through the axial sub-portions;
   f. completely obstructing the axial bore where the mandrel intersects the axial sub-portions;
   g. simultaneously with steps (b), (e), and (i), forming at least one axially-symmetrical axial sealing means from resinous potting material within the shell-side region in a shape which is rotationally symmetrical about the axis, said axial sealing means being interposed between two perimeter sealing means, said axial sealing means being in sealing engagement with the mandrel and extending to a perimeter which is located at a distance away from said cylindrical exterior surface, forming a perimeter sub-portion of the shell-side region between said cylindrical exterior surface and the perimeter of the axial sealing means which is unobstructed to fluid flow, said axial sealing means dividing the shell-side region into two shell-side portions in mutual fluid communication through the perimeter sub-portion;
   h. completely obstructing the axial bore at the point where the axial sealing means is in sealing engagement with the mandrel; and
   i. simultaneously with steps (b), (e), and (g), forming a tube sheet at each of the two bundle ends from resinous potting material, serving to seal each bundle end into an adjacent monolithic tube sheet, a portion of the bundle between the two tube sheets being free from potting material to form a shell-side region.

12. In a method of fabricating a spiral-type hollow fiber membrane fabric-containing cartridge, comprising the following steps;
   a. forming a plurality of hollow fiber membranes each having a lumen, into a fabric-like array in which the hollow fibers substantially are mutually-parallel and constitute the fabric weft, and are held in spaced-apart relationship by filaments constituting the fabric warp; then
   b. forming a spirally-wound membrane bundle having two bundle ends and a cylindrical exterior surface, by winding the array upon a hollow mandrel having a longitudinal axis and a cylindrical exterior surface, an axial bore, and perforations along the surface which communicate with the bore, such that the axis is substantially parallel to the hollow fibers; then
   c. exposing the lumen ends of the hollow fibers constituting at least a first one of the bundle ends to communicate with the exterior of the bundle;
the improvement comprising:
   d. subsequent to step (b), covering the cylindrical exterior surface of the bundle with an impermeable wrapping means; and
   e. simultaneously with steps (b), (g) and (i), forming at least two axially-symmetrical axial sealing means from resinous potting material within the shell-side region, each having a shape which is rotationally symmetrical about the axis, said axial sealing means being spaced apart from each other along the axis, each of said axial sealing means being in sealing engagement with the mandrel and extending to a perimeter which is located at a distance away from said cylindrical exterior surface, each forming a perimeter sub-portion of the shell-side region between said cylindrical exterior surface and the perimeter of the axial sealing means which is unobstructed to fluid flow, said axial sealing means dividing the shell-side region into a plurality of shell-side portions in mutual fluid communication through the perimeter sub-portions;
   f. completely obstructing the axial bore at the point where each axial sealing means is in sealing engagement with the mandrel;
   g. simultaneously with steps (b), (e), and (i), forming at least one axially-symmetrical perimeter sealing means from resinous potting material within the shell-side region in a shape which is rotationally symmetrical about the axis, said perimeter sealing means being interposed between two axial sealing means, and in sealing engagement with the impermeable wrapping means and extending to a distance away from the mandrel, forming an axial sub-portion of the shell-side region which is unobstructed to fluid flow, said perimeter sealing means dividing the shell-side region into two shell-side portions in mutual fluid communication through the axial sub-portion;
   h. completely obstructing the axial bore where the mandrel intersects the axial sub-portion; and
   i. simultaneously with steps (b), (e), and (g), forming a tube sheet at each of the two bundle ends from resinous potting material, serving to seal each bundle end into an adjacent monolithic tube sheet, a portion of the bundle between the two tube sheets being free from potting material to form a shell-side region.

* * * * *